(12) United States Patent
Krishan et al.

(10) Patent No.: US 10,291,539 B2
(45) Date of Patent: May 14, 2019

(54) METHODS, SYSTEMS, AND COMPUTER READABLE MEDIA FOR DISCARDING MESSAGES DURING A CONGESTION EVENT

(71) Applicant: Oracle International Corporation, Redwood Shores, CA (US)

(72) Inventors: Rajiv Krishan, Punjab (IN); Brian John Hassink, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 105 days.

(21) Appl. No.: 15/273,069

(22) Filed: Sep. 22, 2016

(65) Prior Publication Data
US 2018/0083882 A1 Mar. 22, 2018

(51) Int. Cl.
*H04L 12/24* (2006.01)
*H04L 12/823* (2013.01)
(Continued)

(52) U.S. Cl.
CPC ............. *H04L 47/32* (2013.01); *H04L 47/10* (2013.01); *H04L 47/2433* (2013.01);
(Continued)

(58) Field of Classification Search
CPC ....................................................... H04L 47/23
(Continued)

(56) References Cited

U.S. PATENT DOCUMENTS

| 5,084,816 A | 1/1992 | Boese et al. |
| 5,253,248 A | 10/1993 | Dravida et al. |

(Continued)

FOREIGN PATENT DOCUMENTS

| WO | WO 2006/096597 A2 | 9/2006 |
| WO | WO 2012/065477 A1 | 5/2012 |

(Continued)

OTHER PUBLICATIONS

Pietzuch et al., "Congestion Control in a Reliable Scalable Message-Oriented Middleware," University of Cambridge Computer Laboratory, Cambridge, United Kingdom, ACM/IFIP/USENIX Int. Middleware Conference, Springer-Verlag, https://www.doc.ic.ac.uk/~prp/manager/doc/mw2003_cc_gryphon.pdf, pp. 1-20 (2003).

(Continued)

*Primary Examiner* — Shripal K Khajuria
(74) *Attorney, Agent, or Firm* — Jenkins, Wilson, Taylor & Hunt, P.A.

(57) ABSTRACT

The subject matter described herein relates to methods, systems, and computer readable media for discarding messages during a congestion event. One method includes registering a traffic congestion policy for handling traffic associated with an application during congestion. The method further includes determining a first congestion level associated with a congestion event. The method also includes determining message rates of messages associated with similar message priority values, wherein the message priority values are determined using the traffic congestion policy. The method further includes discarding a first message using the message rates, the first congestion level, and a message discard algorithm, wherein the message discard algorithm is determined using the traffic congestion policy.

17 Claims, 5 Drawing Sheets

(51) Int. Cl.
  H04L 12/851 (2013.01)
  H04L 12/801 (2013.01)
  H04L 12/26 (2006.01)
  H04W 28/02 (2009.01)
  H04L 12/815 (2013.01)
  H04L 12/859 (2013.01)
  H04L 12/835 (2013.01)

(52) U.S. Cl.
  CPC ...... *H04L 41/0893* (2013.01); *H04L 43/0882* (2013.01); *H04L 43/0894* (2013.01); *H04L 47/11* (2013.01); *H04L 47/22* (2013.01); *H04L 47/2475* (2013.01); *H04L 47/29* (2013.01); *H04L 47/30* (2013.01); *H04W 28/0289* (2013.01)

(58) Field of Classification Search
  USPC ....................................................... 370/235
  See application file for complete search history.

(56) References Cited

U.S. PATENT DOCUMENTS

| | | | |
|---|---|---|---|
| 5,915,013 | A | 6/1999 | Mintz et al. |
| 5,933,474 | A | 8/1999 | Kipp |
| 6,018,515 | A | 1/2000 | Sorber |
| 6,115,383 | A | 9/2000 | Bell et al. |
| 6,212,164 | B1 | 4/2001 | Murakami et al. |
| 6,215,765 | B1 | 4/2001 | McAllister et al. |
| 6,606,379 | B2 | 8/2003 | Khadri et al. |
| 6,704,287 | B1 | 3/2004 | Moharram |
| 6,747,955 | B1 | 6/2004 | Archer |
| 6,839,423 | B2 | 1/2005 | Khadri et al. |
| 6,996,225 | B1 | 2/2006 | Bordonaro et al. |
| 7,324,451 | B2 | 1/2008 | Hanif et al. |
| 8,014,510 | B2 | 9/2011 | Bordonaro et al. |
| 8,547,846 | B1 | 10/2013 | Ma et al. |
| 8,903,074 | B2 | 12/2014 | Delaney et al. |
| 9,112,784 | B2 | 8/2015 | Chen et al. |
| 2001/0049730 | A1 | 12/2001 | Brendes et al. |
| 2006/0198508 | A1 | 9/2006 | Delaney et al. |
| 2007/0237074 | A1 | 10/2007 | Curry |
| 2011/0239226 | A1 | 9/2011 | Placanica |
| 2014/0328172 | A1 | 11/2014 | Kumar et al. |
| 2016/0104377 | A1* | 4/2016 | French .................. H04H 20/55 701/117 |
| 2018/0057368 | A1 | 3/2018 | Hubrig et al. |

FOREIGN PATENT DOCUMENTS

| | | |
|---|---|---|
| WO | WO 2015/139726 A1 | 9/2015 |
| WO | WO-2018/057368 | 3/2018 |

OTHER PUBLICATIONS

"Cisco IOS Quality of Service Solutions Configuration Guide, Release 12.2," Chapter: Policing and Shaping Overview, Cisco http://www.cisco.com/c/en/us/td/docs/ios/12_2/qos/configuration/guide/fqos_c/qcfpolsh.html, pp. 1-15 (Jan. 30, 2014).

Notice of Allowance and Fee(s) Due & Interview Summary for U.S. Appl. No. 11/071,946 (dated Aug. 12, 2014).

Applicant-Initiated Interview Summary for U.S. Appl. No. 11/071,946 (dated May 14, 2014).

Final Office Action for U.S. Appl. No. 11/071,946 (dated Mar. 6, 2014).

Non-Final Office Action for U.S. Appl. No. 11/071,946 (dated Aug. 15, 2013).

Interview Summary for U.S. Appl. No. 11/071,946 (dated Aug. 20, 2010).

Final Office Action for U.S. Appl. No. 11/071,946 (dated Mar. 18, 2010).

Interview Summary for U.S. Appl. No. 11/071,946 (dated Dec. 14, 2009).

Non-Final Office Action for U.S. Appl. No. 11/071,946 (dated Jul. 7, 2009).

Non-Final Office Action for U.S. Appl. No. 11/071,946 (dated Dec. 10, 2008).

Notification of Transmittal of the International Search Report and the Written Opinion of the International Searching Authority, or the Declaration for International Application No. PCT/US06/07838 (dated Feb. 5, 2007).

Russell, "Signaling System #7," Third Edition, Chapter 6, pp. 230-232 (Copyright 2000).

Notification of Transmittal of the International Search Report and the Written Opinion of the International Searching Authority, or the Declaration for International Application No. PCT/US2017/051351 (dated Dec. 13, 2017).

* cited by examiner

| | P-0 (LOWEST PRIORITY) | P-1 | P-2 | P-3 | P-4 | P-5 (HIGHEST PRIORITY) | TOTAL RATE |
|---|---|---|---|---|---|---|---|
| CL-0 (NO CONGESTION) | 25 K/SEC | 15 K/SEC | 10 K/SEC | 30 K/SEC | 10 K/SEC | 10 K/SEC | 100 K/SEC |
| CL-1 | 0 K/SEC | 0 K/SEC | 0 K/SEC | 30 K/SEC | 10 K/SEC | 10 K/SEC | 50 K/SEC |
| CL-2 | 0 K/SEC | 0 K/SEC | 0 K/SEC | 15 K/SEC | 10 K/SEC | 10 K/SEC | 35 K/SEC |
| CL-3 (SEVERE CONGESTION) | 0 K/SEC | 0 K/SEC | 0 K/SEC | 0 K/SEC | 10 K/SEC | 10 K/SEC | 20 K/SEC |

| | P-0 (LOWEST PRIORITY) | P-1 | P-2 | P-3 | P-4 | P-5 (HIGHEST PRIORITY) | TOTAL RATE |
|---|---|---|---|---|---|---|---|
| CL-0 (NO CONGESTION) | 25 K/SEC | 15 K/SEC | 10 K/SEC | 30 K/SEC | 10 K/SEC | 10 K/SEC | 100 K/SEC |
| CL-1 | 0 K/SEC | 0 K/SEC | 0 K/SEC | 30 K/SEC | 10 K/SEC | 10 K/SEC | 50 K/SEC |
| CL-2 | 0 K/SEC | 0 K/SEC | 0 K/SEC | 15 K/SEC | 10 K/SEC | 10 K/SEC | 35 K/SEC |
| CL-3 (SEVERE CONGESTION) | 0 K/SEC | 0 K/SEC | 0 K/SEC | 8 K/SEC | 10 K/SEC | 10 K/SEC | 28 K/SEC |

METHODS, SYSTEMS, AND COMPUTER READABLE MEDIA FOR DISCARDING MESSAGES DURING A CONGESTION EVENT

TECHNICAL FIELD

The subject matter described herein relates to computer network traffic management. More specifically, the subject matter relates to methods, systems, and computer readable media for discarding messages during a congestion event.

BACKGROUND

Traffic related congestion in computer networks can prevent or hinder messages from reaching appropriate destinations. For example, authentication messages may be used to authenticate subscribers for service access. If subscribers are not authenticated because a network or a node therein is too congested to route or process authentication messages in a timely manner, subscribers may be denied service access. To reduce problems associated with traffic related congestion, many networks attempt to discard less important messages, while still allowing some important messages during a congestion event (e.g., an event or period of time when congestion is detected, such as when a network node is overloaded). However, various factors may need to be considered when determining which messages to discard and which messages to allow when congestion is detected.

SUMMARY

The subject matter described herein relates to methods, systems, and computer readable media for discarding messages during a congestion event. One method includes registering a traffic congestion policy for handling traffic associated with an application during congestion. The method further includes determining a first congestion level associated with a congestion event. The method also includes determining message rates of messages associated with similar message priority values, wherein the message priority values are determined using the traffic congestion policy. The method further includes discarding a first message using the message rates, the first congestion level, and a message discard algorithm, wherein the message discard algorithm is determined using the traffic congestion policy.

A system for discarding messages during a congestion event includes at least one processor and a traffic manager. The traffic manager is implemented using the at least one processor. The traffic manager is configured for registering a traffic congestion policy for handling traffic associated with an application during congestion; for determining a first congestion level associated with a congestion event; for determining message rates of messages associated with similar message priority values, wherein the message priority values are determined using the traffic congestion policy; and for discarding a first message associated with the application using one or more of the message rates, the congestion level, and a message discard algorithm, wherein the message discard algorithm is determined using the traffic congestion policy.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a non-transitory computer readable medium that implements the subject matter described herein may be located on a single device or computing platform or may be distributed across multiple devices or computing platforms.

As used herein, the term "node" refers to at least one physical computing platform including one or more processors and memory. For example, a node may include a virtual machine and/or software executing on a physical computing platform.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for discarding messages during a congestion event. Traffic related congestion can occur when a network node receives more messages than it can process or handle (e.g., route, respond to, etc.) Various issues can arise when a network node experiences congestion including dropped calls and/or terminated connections. To reduce traffic related congestion, some networks may detect congestion events at various congestion points (e.g., one or more network nodes or modules therein) and perform various actions for mitigating congestion and congestion related issues when a congestion event is detected. For example, to mitigate congestion, a message discard policy may be used which defines what types of messages should be allowed and/or discarded.

In accordance with some aspects of the subject matter described herein, techniques, methods, systems, or mechanisms are disclosed for pluggable traffic congestion policies. For example, a network node or module may represent a congestion point in a network. In this example, the node or module may be configured for receiving and registering dynamic and/or pluggable traffic congestion policies for one or more applications. Continuing with this example, the node or module may use a particular traffic congestion policy for determining whether to allow or discard messages associated with a particular application during a congestion event and may use another traffic congestion policy for handling other traffic.

In accordance with some aspects of the subject matter described herein, techniques, methods, systems, or mechanisms are disclosed for utilizing messages rates, congestion levels, and/or policy-defined priority values in message discard algorithms. For example, a traffic congestion policy may define or indicate a message discard algorithm that determines a congestion level (e.g., a value indicating congestion at a congestion point) for a congestion event and that determines message rates of messages associated with similar message priority values (e.g., calculated or determined based on policy defined factors). Continuing with this example, for a given congestion level, the message discard algorithm may limit message rates of messages associated with lower message priority values more than message rates of messages associated with higher message priority values, e.g., by discarding messages. In some examples, as congestion levels increase for a given congestion event, the message discard algorithm may progressively limit message rates of messages associated with various message priority values.

Advantageously, in accordance with some aspects of the subject matter described herein, by using pluggable traffic congestion policies, computer capabilities associated with congestion management are improved, e.g., by reducing the length of congestion events and/or by mitigating the effects of congestion related issues. Further, congestion management can be improved by utilizing application-specific features and/or factors when determining whether to allow or discard messages during a congestion event.

Reference will now be made in detail to various examples of the subject matter described herein, some examples of which are illustrated in the accompanying drawings. Wherever possible, the same reference numbers will be used throughout the drawings to refer to the same or like parts.

Figure 1:
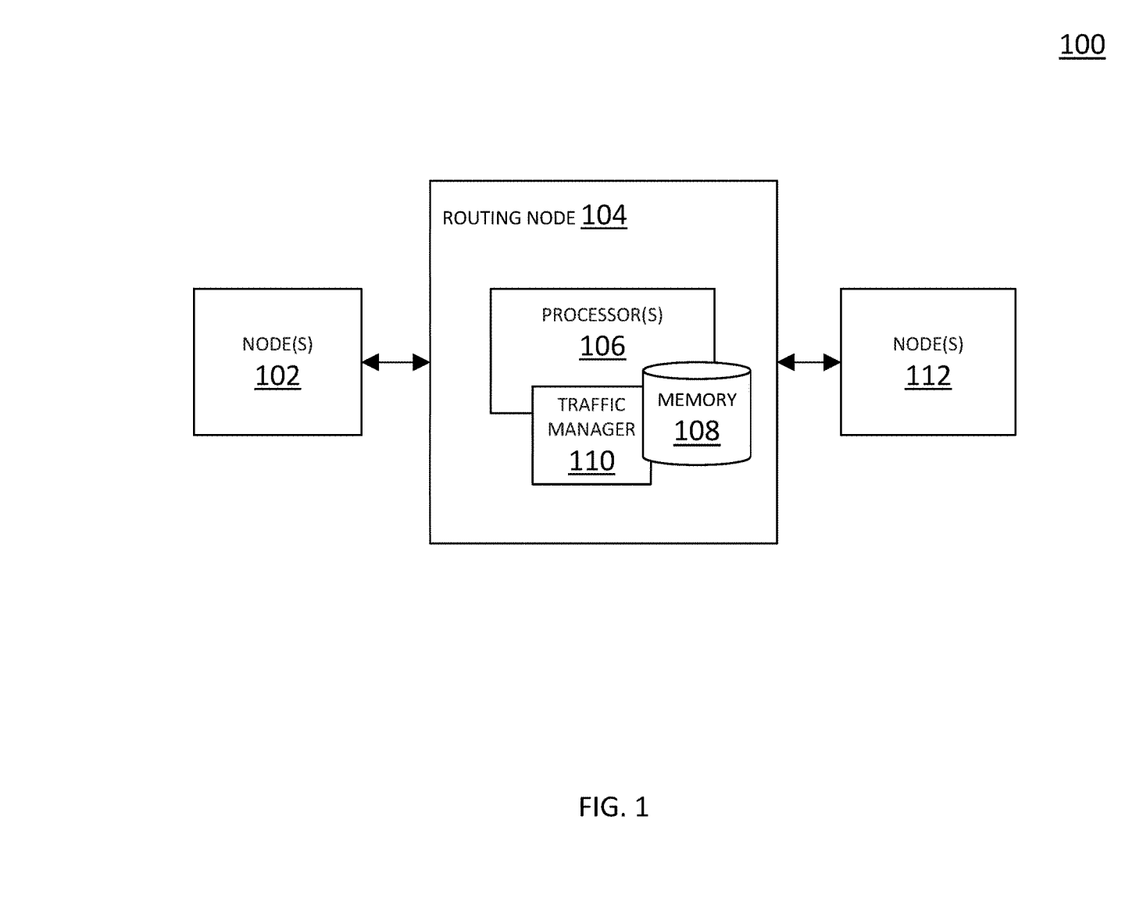
FIG. 1 is a block diagram illustrating an example computing environment.

FIG. 1 is a block diagram illustrating an example computing environment 100. Referring to FIG. 1, computing environment 100 may include node(s) 102, routing node (RN) 104, and/or node(s) 112. Each of node(s) 102 and node(s) 112 may represent one or more suitable entities (e.g., software executing on at least one processor, one or more computing platforms, etc.) capable of communicating using at least one communications protocol, such as using one or more network layer protocols (e.g., an Internet protocol (IP)); one or more transport layer protocols (e.g., a transmission control protocol (TCP), a user datagram protocol (UDP), a stream control transmission protocol (SCTP), and/or a reliable data protocol (RDP)); and/or one or more session layer protocols (e.g., a Diameter protocol, a hypertext transfer protocol (HTTP), and/or a real-time transport protocol (RTP)). For example, each of node(s) 102 and 112 may be a client, a server, a Diameter node, a network node, mobility management entity (MME), a home subscriber server (HSS), an authentication, authorization, and/or accounting (AAA) server, a Diameter application server, a subscriber profile repository (SPR), or other node. Each of node(s) 102 and 112 may include functionality for sending, receiving, and/or processing various messages. For example, node(s) 102 may include clients requesting subscriber-related information and node(s) 112 may include servers providing subscriber-related information.

RN 104 may represent any suitable entity or entities (e.g., software executing on at least one processor, one or more computing platforms, etc.) for receiving, processing, routing, and/or discarding messages, such as IP messages, TCP messages, Diameter messages, HTTP messages, and other messages. For example, RN 104 may include or represent an IP router, an IP switch, a long term evolution (LTE) signaling router, a Diameter signaling router, a Diameter proxy, a Diameter agent, a Diameter routing agent, a Diameter relay agent, Diameter translation agent, or a Diameter redirect agent. RN 104 may include functionality for processing and/or routing various messages. In some embodiments, such functionality may be included in one or more modules (e.g., a session routing module).

RN 104 may include functionality for receiving, processing, and/or switching or routing various messages and may include various communications interfaces for communicating with various nodes, e.g., 3rd Generation Partnership Project (3GPP) LTE communications interfaces and other (e.g., non-LTE) communications interfaces. Some example communications interfaces for communicating with various nodes may include an IP interface, a TCP interface, a UDP interface, an HTTP interface, an RDP interface, an SCTP interface, an RTP interface, a Diameter interface, an LTE interface, and/or an IMS interface.

RN 104 may facilitate communication between node(s) 102 and node(s) 112. For example, node(s) 102 may represent a Diameter client and may send a Diameter request message (e.g., a Diameter session establishment request message) to RN 104. The Diameter request message may require information or one or more services from node(s) 112. RN 104 may route, relay, and/or translate requests or responses between node(s) 102 and node(s) 112. After receiving and processing the Diameter request message, node(s) 112 may send a Diameter response message (e.g., a Diameter session establishment response message) to RN 104. The Diameter response message may be sent in response to the Diameter request message originated by node(s) 102. RN 104 may provide the Diameter response message to node(s) 102.

In some embodiments, RN 104 may include processor(s) 106, memory 108, and/or a traffic manager (TM) 110. Processor(s) 106 may represent or include at least one of a physical processor, a general purpose microprocessor, a single-core processor, a multi-core processor, a field-programmable gate array (FPGA), and/or an application-specific integrated circuit (ASIC). In some embodiments, processor(s) 106 may be configured to execute software stored in one or more non-transitory computer readable media, such as memory 108. For example, software may be loaded into a memory structure for execution by processor(s) 106. In some embodiments, e.g., where RN 104 includes multiple processors, some processor(s) 106 may be configured to operate independently of other processor(s) 106.

TM 110 may be any suitable entity or entities (e.g., software executing on processor(s) 106, an ASIC, an FPGA, or a combination of software, an ASIC, or an FPGA) for performing one or more aspects associated with traffic management and/or traffic related congestion management. For example, TM 110 may include or represent any programmable unit to discard or allow various messages (e.g., IP messages, Diameter messages, HTTP messages, etc.) based on message priority values and a congestion level of RN 104 and/or another node (e.g., node(s) 102 and 112). In some embodiments, TM 110 may be implemented using processor(s) 106 and/or one or more memories, such as memory 108. For example, TM 110 may utilize processor(s) 106 (e.g., using software stored in local memory) and random access memory (RAM).

In some embodiments, TM 110 may include functionality for receiving, registering, and/or using traffic congestion policies. For example, a traffic congestion policy may include or indicate a message discard algorithm for determining whether to discard or allow messages associated with an application using one or more policy determinable factors. Some examples of policy determinable factors may include a policy-defined message priority value, a message parameter value, a message type, a message event, a message attribute (e.g., a priority attribute value pair (AVP)), a detected congestion level, a path related congestion indicator (e.g., a color code), and/or one or more message rates for given message group (e.g., messages of a certain priority). In this example, TM 110 may be configured for registering and using the traffic congestion policy without requiring RN 104 and/or TM 110 to reboot or restart.

In some embodiments, TM 110 may include functionality for allowing an application or other entity (e.g., a network operator or device) to register a traffic congestion policy for message handling during congestion based on policy-defined message priorities. For example, a traffic congestion policy may be capable of supporting traffic policing for messages associated with message priority values (e.g., values between 1-15) that differ from the number of congestion levels (values between 1-4) detected at RN 104. In this example, the traffic congestion policy or a related message discard algorithm may map at least some congestion management actions associated with a congestion level to message groups associated with different message priority values.

In some embodiments, TM 110 may include functionality for tracking an existing or current traffic pattern at RN 104 and/or determining messages rates for similarly grouped messages. For example, TM 110 may be configured for identifying and grouping messages (e.g., traffic received at RN 104) using policy determinable factors (e.g., event priority, event type, message type, path related congestion indicator, or an application-specific parameter value) and, by identifying and grouping messages, may track, measure, and/or determine message rates at which similarly grouped messages are received at and/or sent from RN 104.

In some embodiments, TM 110 may include functionality for shaping traffic (e.g., traffic leaving RN 104), e.g., by discarding at least some messages using traffic pattern information, a congestion level associated with a node (e.g., RN 104), and/or one or more policy-defined message priority values. For example, for a given congestion level, a message discard algorithm may limit message rates of messages associated with lower priority values more than message rates of messages associated with higher priority values, e.g., by discarding such messages. In some examples, as congestion levels increase for a given congestion event, the message discard algorithm may progressively reduce traffic rate limits of messages associated with various message priority values.

Memory 108 may be any suitable entity or entities (e.g., one or more memory devices) for storing information associated with traffic management (e.g., traffic tracking, traffic shaping, etc.) and/or traffic related congestion management. For example, memory 108 may store one or more traffic congestion policies, one or more message discard algorithms, message statistics, message priority values, message rates, and/or other traffic related information.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
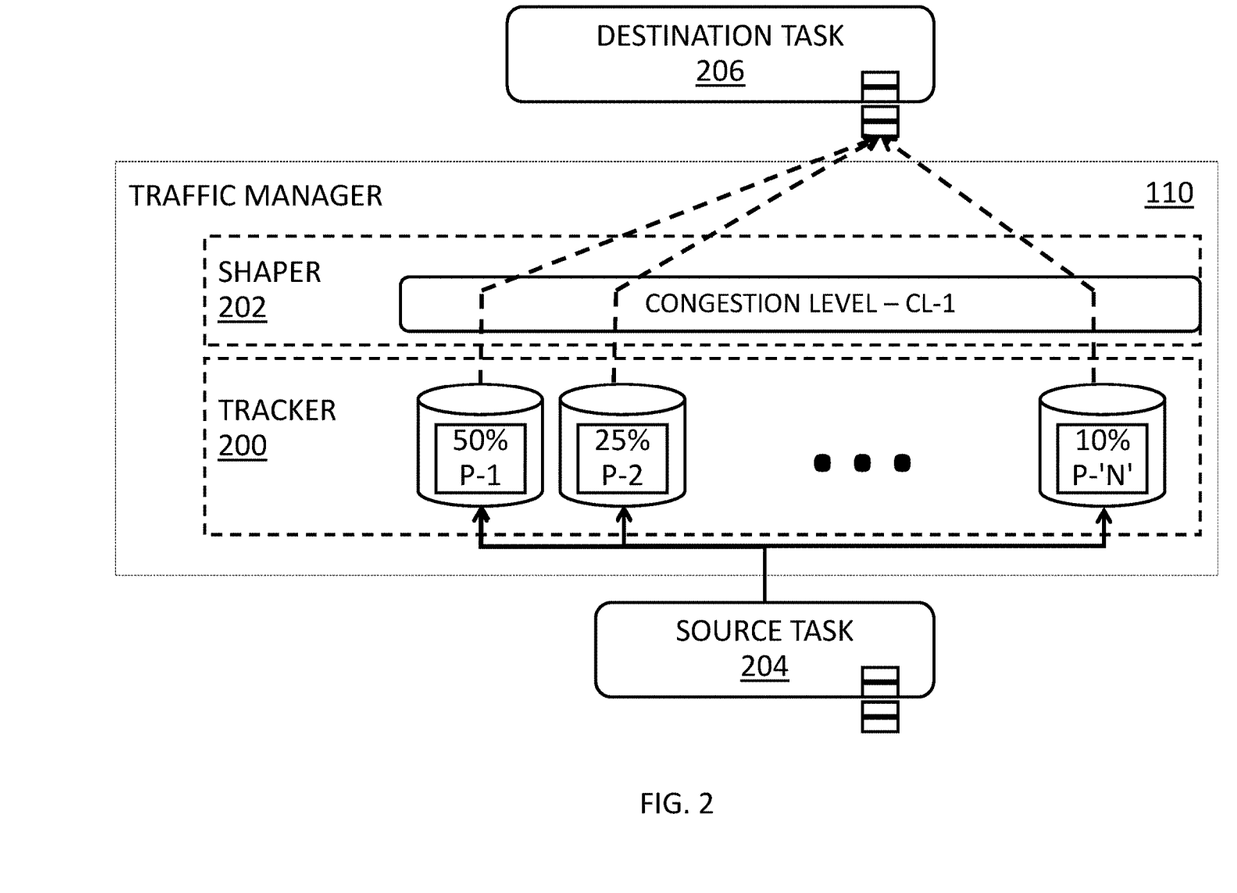
FIG. 2 is a block diagram illustrating an example traffic manager.

FIG. 2 is a block diagram illustrating an example TM 110. Referring to FIG. 2, TM 110 may interact with and/or communicate with source task 204 and/or destination task 206. Source task 204 may be any entity (e.g., a node, a module, etc.) that provides messages to TM 110 and destination task 208 may be any entity that receives messages from TM 110. For example, source task 204 may include node(s) 102 and/or modules within RN 104. In another example, destination task 206 may include node(s) 112 and/or modules within RN 104. In some embodiments, source task 204 and/or destination task 206 may include or utilize one or more buffers or memories for storing messages. For example, source task 204 may store incoming messages waiting to be processed by RN 104 and/or TM 110 and destination task 206 may store outgoing messages from RN 104 and/or TM 110, e.g., messages that are to be sent or routed onward by RN 104.

TM 110 may include or interact with a tracker 200 and a shaper 202. Tracker 200 may be any suitable entity or entities (e.g., software executing on processor(s) 106, an ASIC, an FPGA, or a combination of software, an ASIC, or an FPGA) for tracking message rates of incoming and/or outgoing messages. In some embodiments, tracker 200 may utilize a traffic congestion policy and/or related information for categorizing or grouping messages using policy determinable message priority values. Tracker 200 may also track message rates of similarly grouped messages, e.g., messages associated with a same message priority value. For example, tracker 200 may determine a message rate of messages associated with a message priority value of '1', a message rate of messages associated with a message priority value of '2', and a message rate of messages associated with a message priority value of '3'.

In some embodiments, TM 110 and/or tracker 200 may utilize a traffic congestion policy for determining message priority values for various messages using one or more message attributes, connection attributes, and/or path related attributes. For example, a traffic congestion policy may define or indicate that a priority AVP and/or a color code (e.g., a path or connection related congestion indicator assigned by customer rules and/or policy-defined rules) are to be used for determining message priority for Diameter messages.

In some embodiments, a traffic congestion policy may define or indicate how to generate or calculate message priority values for various messages. For example, a traffic congestion policy may indicate that bit or byte operations (e.g., bit concatenation and/or bit arithmetic) may be used for generating a message priority value using multiple factors or values. In this example, the traffic congestion policy may indicate that a message priority value may be calculated by concatenating one or more bits from a first attribute and one or more bits from another attribute.

In some embodiments, TM 110 or a related entity therein may generate a message priority value by concatenating a number of most significant (left) bits from a first attribute (e.g., a value from a priority AVP) with a number of least significant bits (right) from a second attribute (e.g., a color code). For example, assume that a priority value from a priority AVP can be 0-15 (where 15 is the highest priority) and a color code can be 0-3 (where 3 is the highest priority color). Continuing with this example, concatenating a priority value of '10' (0xa) and a color code of '0' (0x0) may yield a message priority value of '160' (0xa0x0) and concatenating a priority value of '10' (0xa) and a color code of '3' (0x3) may yield a message priority value of '163' (0xa0x0).

Shaper 202 may be any suitable entity or entities (e.g., software executing on processor(s) 106, an ASIC, an FPGA, or a combination of software, an ASIC, or an FPGA) for performing traffic shaping and/or congestion management. For example, shaper 202 may utilize a traffic congestion policy and/or related information, e.g., a congestion level and information captured and/or derived by tracker 200, to determine which messages to discard or allow during a congestion event. In this example, shaper 202 may use a message discard algorithm that restricts or limits message rates of messages associated with certain message priority values and may progressively discard more messages as congestion levels increase.

In some embodiments, a traffic congestion policy and/or a related discard algorithm may use message priority values when shaping traffic (e.g., discarding some traffic) during a congestion event. For example, where a traffic congestion policy and/or a related discard algorithm uses message rate limits, the traffic congestion policy and/or the related discard algorithm may enforce a total message rate limit (e.g., based on all message rates of messages received at RN 104) by first limiting message rates of messages associated with lower priority message values before affecting (e.g., limiting) the message rates of messages associated with higher priority message values. In this example, by using policy determinable message priority values in determining which messages to discard, the traffic congestion policy and/or the related discard algorithm can be configured for any environment and/or application usage.

In some embodiments, tracker 200 may include functionality for determining message rates before and/or after message rate limits are enforced. For example, tracker 200 may track message rates for incoming messages prior to discarding messages and may also track and/or verify message rates (e.g., outgoing messages to destination task 206) after shaper 202 discards messages to enforce and/or verify a particular message rate limit.

It will be appreciated that FIG. 2 is for illustrative purposes and that various nodes, their locations, and/or their functions (e.g., modules) described above in relation to FIG. 2 may be changed, altered, added, or removed. For example, some nodes and/or functions may be combined into a single entity. In another example, some nodes and/or functions may be distributed across multiple nodes and/or platforms.

Figure 3:
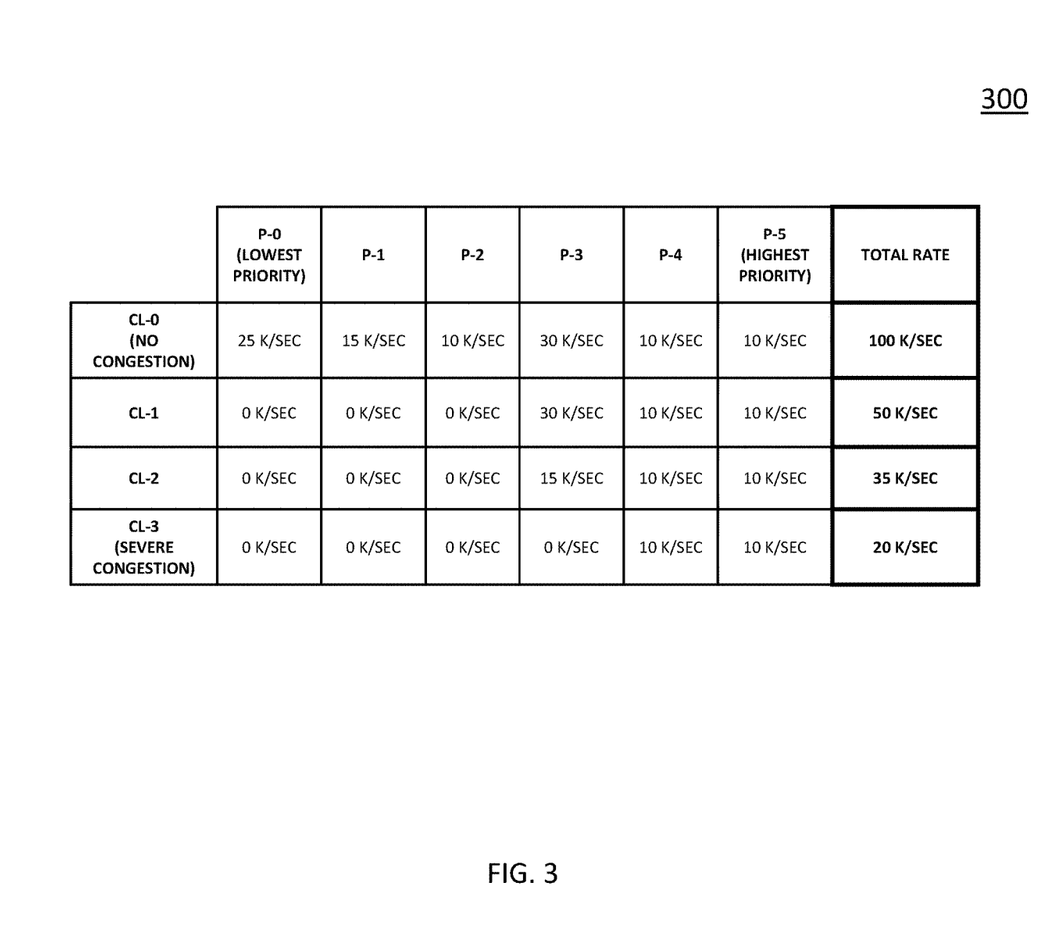
FIG. 3 depicts an example of traffic congestion policy information.

FIG. 3 depicts an example of traffic congestion policy information. In some embodiments, TM 110 may utilize traffic congestion policies that adjusts or reduces messages rates based on fixed amounts for various congestion levels. For example, a congestion policy or related discard algorithm may enforce a total message rate limit of 50 thousand messages per second (K/sec) during a congestion level '1' event, a total message rate limit of 35 K/sec during a congestion level '2' event, and a total message rate limit of 28 K/sec during a congestion level '3' event. In another example, a congestion policy or related discard algorithm may enforce a total message rate based on message priority values and congestion levels, where lower priority messages have lower message rate limits than higher priority messages and where the message rates are limited more as congestion levels increase.

In some embodiments, each message priority value may be determined by using one or more policy determinable factors, e.g., event priority, event type, message type, path related congestion indicator, or an application-specific parameter value. In some embodiments, each congestion level may represent a particular amount of congestion being experienced by RN 104, TM 110, and/or another entity. Various mechanisms and/or methods may be utilized for determining congestion levels, e.g., queue based techniques, message rate based techniques, and/or other techniques.

Referring to FIG. 3, table 300 may represent a traffic congestion policy or a related message discard algorithm involving messages rates associated with a number of message priority values (e.g., P-0-P-5) and a number of congestion levels (e.g., CL-0-CL-4). As depicted in table 300, each row may represent a traffic congestion policy and/or a related message discard algorithm at a particular congestion level. For example, each row may represent or indicate whether message rates associated with particular message priority values are limited (e.g., restricted) or unchanged (e.g., unaffected) during a congestion level. In this example, as congestion levels increase, more message rate limits may be enforced. In some embodiments, as congestion levels increase, a traffic congestion policy may enforce a message rate limit with regard to total message rate (e.g., at RN 104) and/or for particular message priority values.

As depicted in row 'CL-0' of table 300, a traffic congestion policy may not enforce message rate restrictions or limits during a congestion level of 'CL-0' (e.g., no congestion is detected). For example, message rates of 'P-0'-'P-5' are depicted without any message rate restrictions or limits being enforced and the sum of the messages rates of 'P-0'-'P-5' is depicted as the total message rate (e.g., received by RN 104) of '100 K/sec'.

As depicted in row 'CL-1' of table 300, a traffic congestion policy may enforce a total message rate limit of '50 K/sec' during a congestion level of 'CL-1' (e.g., minor congestion is detected). For example, to enforce the total message rate limit of '50 K/sec', the traffic congestion policy represented by table 300 may drop all messages associated with message priority values 'P-0'-'P-2' and may allow (e.g., process and/or route) all messages associated with message priority values 'P-3'-'P-5'.

As depicted in row 'CL-2' of table 300, a traffic congestion policy may enforce a total message rate limit of '35 K/sec' during a congestion level of 'CL-2' (e.g., moderate congestion is detected). For example, to enforce the total message rate limit of '35 K/sec', the traffic congestion policy represented by table 300 may drop all messages associated with message priority values 'P-0'-'P-2' and may drop some of the messages associated with 'P-3', and may allow (e.g., process and/or route) all messages associated with message priority values 'P-4-P-5.

As depicted in row 'CL-3' of table 300, a traffic congestion policy may enforce a total message rate limit of '20 K/sec' during a congestion level of 'CL-3' (e.g., severe congestion is detected). For example, to enforce the total message rate limit of '20 K/sec', the traffic congestion policy represented by table 300 may drop all messages associated with message priority values 'P-0'-'P-3' and may allow (e.g., process and/or route) all messages associated with message priority values 'P-4-P-5.

It will be appreciated that table 300 is for illustrative purposes and that different and/or additional information, logic, message rates, and/or data than described above with regard to FIG. 3 may be usable by RN 104 or TM 110. It will also be appreciated that comments depicted in FIG. 3 are for illustrative purposes and are not to be construed as limitations of RN 104 or functionality therein.

Figure 4:
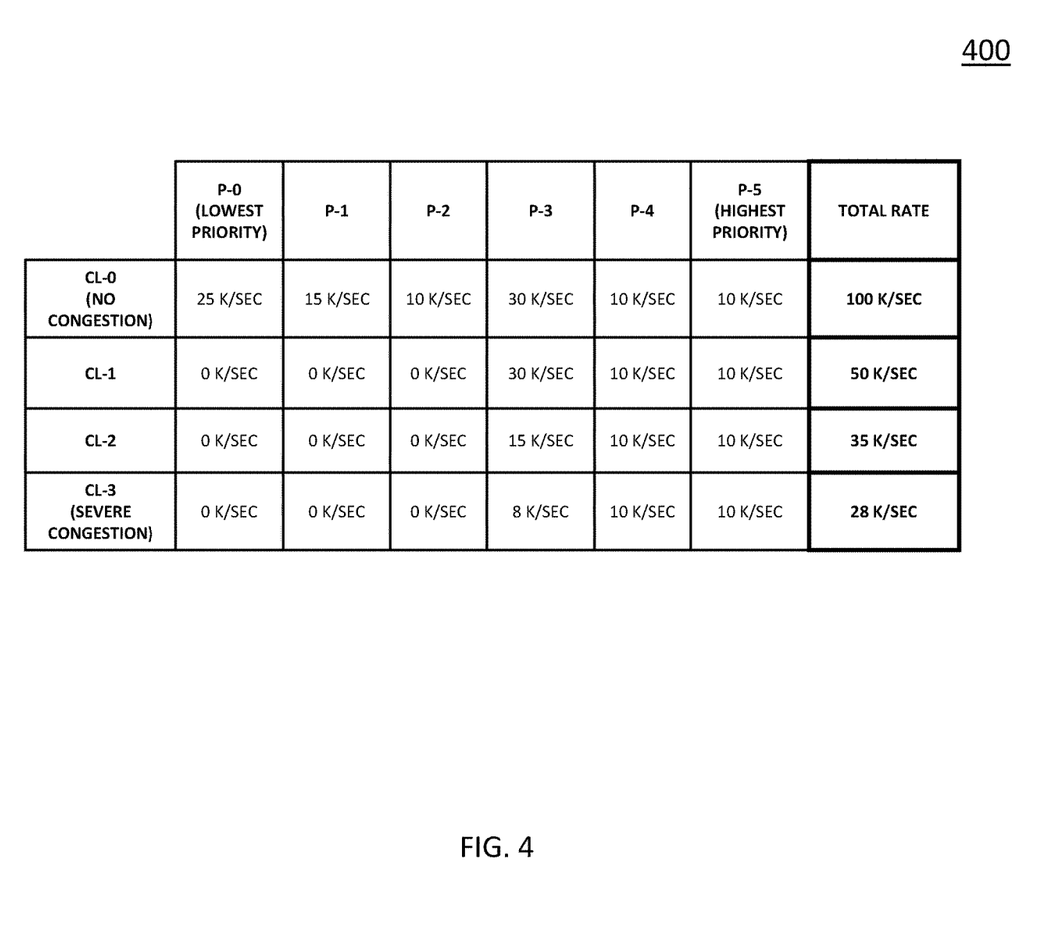
FIG. 4 depicts another example of traffic congestion policy information.

FIG. 4 depicts another example of traffic congestion policy information. In some embodiments, TM 110 may utilize traffic congestion policies that adjusts or reduces messages rates based on percentages amounts for various congestion levels. For example, a congestion policy or related discard algorithm may enforce a total message rate limit that is 50% less than a normal (e.g., unrestricted) total message rate. In this example, the total message rate limit may progressively decrease as congestion levels increase, e.g., by a percentage of the normal total message rate or a previous total message rate limit. In another example, a congestion policy or related discard algorithm may enforce a total message rate based on message priority values and congestion levels, where lower priority messages have lower message rate limits than higher priority messages and where the message rates are limited more as congestion levels increase.

In some embodiments, each message priority value may be determined by using one or more policy determinable factors, e.g., event priority, event type, message type, path related congestion indicator, or an application-specific parameter value. In some embodiments, each congestion level may represent a particular amount of congestion being experienced by RN 104, TM 110, and/or another entity. Various mechanisms and/or methods may be utilized for determining congestion levels, e.g., message queue based techniques, message rate based techniques, and/or other techniques.

Referring to FIG. 4, table 400 may represent a traffic congestion policy or a related message discard algorithm involving messages rates associated with a number of message priority values (e.g., P-0-P-5) and a number of congestion levels (e.g., CL-0-CL-4). As depicted in table 400, each row may represent a traffic congestion policy and/or a related message discard algorithm at a particular congestion level. For example, each row may represent or indicate whether message rates associated with particular message priority values are limited (e.g., restricted) or unchanged (e.g., unaffected) during a congestion level. In this example, as congestion levels increase, more message rate limits may be enforced. In some embodiments, as congestion levels increase, a traffic congestion policy may enforce a message rate limit with regard to total message rate (e.g., at RN 104) and/or for particular message priority values.

As depicted in row 'CL-0' of table 400, a traffic congestion policy may not enforce message rate restrictions or limits during a congestion level of 'CL-0' (e.g., no congestion is detected). For example, message rates of 'P-0'-'P-5' are depicted without any message rate restrictions or limits being enforced and the sum of the messages rates of 'P-0'-'P-5' is depicted as the total message rate (e.g., received by RN 104) of '100 K/sec'.

As depicted in row 'CL-1' of table 400, a traffic congestion policy may enforce a total message rate limit of '50 K/sec' (e.g., calculated by multiplying the total message rate of 'CL-0' by 50%) during a congestion level of 'CL-1' (e.g., minor congestion is detected). For example, to enforce the total message rate limit of '50 K/sec', the traffic congestion policy represented by table 400 may drop all messages associated with message priority values 'P-0'-'P-2' and may allow (e.g., process and/or route) all messages associated with message priority values 'P-3'-'P-5'.

As depicted in row 'CL-2' of table 400, a traffic congestion policy may enforce a total message rate limit of '35 K/sec' (e.g., calculated by multiplying the total message rate of 'CL-1' by 70%) during a congestion level of 'CL-2' (e.g., moderate congestion is detected). For example, to enforce the total message rate limit of '35 K/sec', the traffic congestion policy represented by table 400 may drop all messages associated with message priority values 'P-0'-'P-2' and may drop some of the messages associated with 'P-3', and may allow (e.g., process and/or route) all messages associated with message priority values 'P-4-P-5.

As depicted in row 'CL-3' of table 400, a traffic congestion policy may enforce a total message rate limit of '28 K/sec' (e.g., calculated by multiplying the total message rate of 'CL-2' by 80%) during a congestion level of 'CL-3' (e.g., severe congestion is detected). In this example, to enforce the total message rate limit of '28 K/sec', the traffic congestion policy represented by table 400 may drop all messages associated with message priority values 'P-0'-'P-2' and may drop some of the messages associated with 'P-3', and may allow (e.g., process and/or route) all messages associated with message priority values 'P-4-P-5.

It will be appreciated that table 400 is for illustrative purposes and that different and/or additional information, logic, message rates, and/or data than described above with regard to FIG. 4 may be usable by RN 104 or TM 110. It will also be appreciated that comments depicted in FIG. 4 are for illustrative purposes and are not to be construed as limitations of RN 104 or functionality therein.

Figure 5:
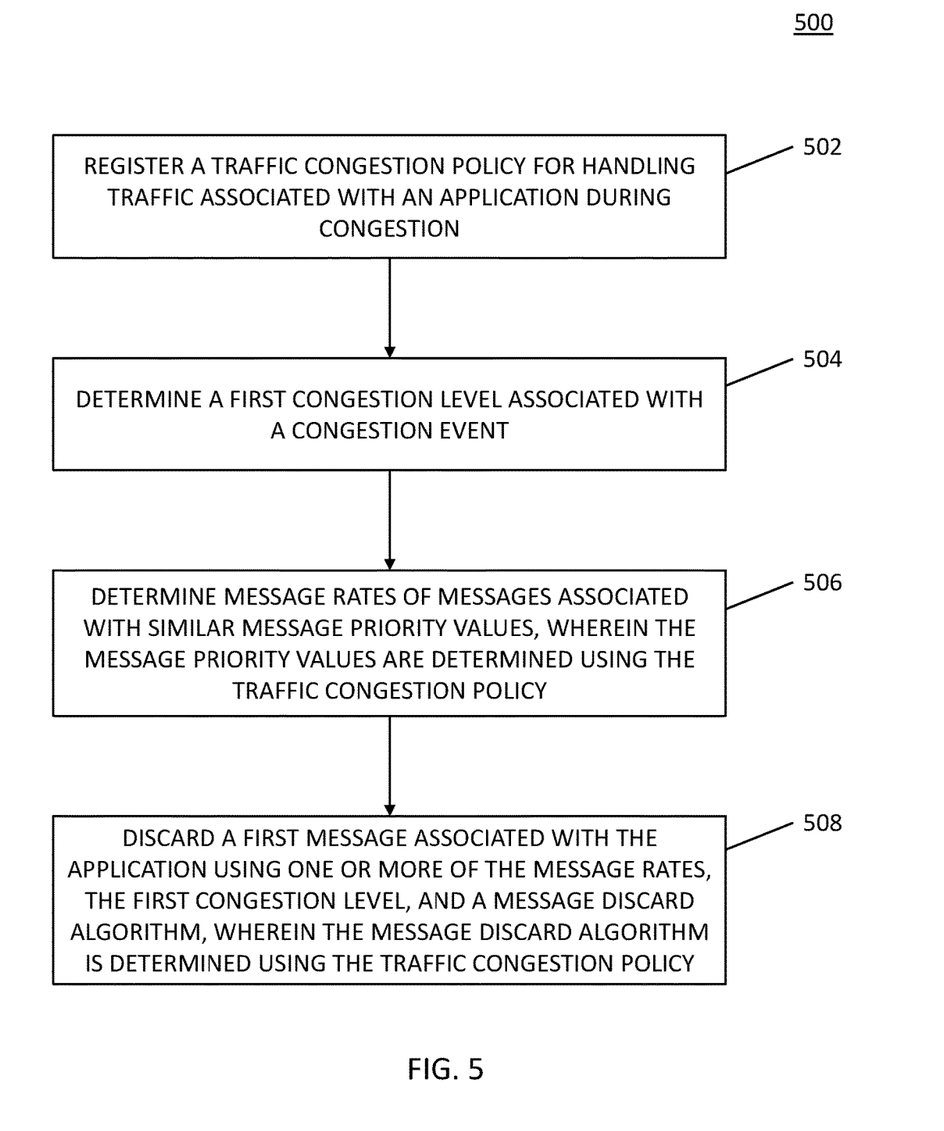
FIG. 5 is a flow chart illustrating a process for discarding messages during a congestion event.

FIG. 5 is a flow chart illustrating a process for discarding messages during a congestion event. In some embodiments, process 500, or portions thereof (e.g., steps 502, 504, 506 and/or 508), may be performed by or at RN 104, TM 110, and/or another node or module.

Referring to process 500, in step 502, a traffic congestion policy for handling traffic associated with an application during congestion may be registered. For example, a Diameter application or a related node may register a traffic congestion policy with RN 104 and/or TM 110 for handling Diameter messages during a congestion event at RN 104. In another example, a web application or a web server may register a traffic congestion policy with RN 104 and/or TM 110 for handling HTTP and/or IP messages during a congestion event at RN 104.

In step 504, a first congestion level associated with a congestion event may be determined. For example, RN 104 or TM 110 may use a message queue based congestion detection mechanism, where as one or more message queues reach increasing threshold amounts, a congestion level increases, e.g., values between 0 and 3, where 0 is no congestion and 3 is the highest level of congestion. In another example, RN 104 or TM 110 may use a message rate based congestion detection mechanism, where as a total incoming message rate reaches increasing threshold rates, a congestion level increases.

In step 506, message rates of messages associated with similar message priority values may be determined. The message priority values may be determined using the traffic congestion policy. For example, a traffic congestion policy may define or indicate how message priority values are calculated and/or what factors to use in their calculation and may use these message priority values when determining message rates for similar traffic.

In step 508, a first message associated with the application may be discarded using one or more of the message rates, the first congestion level, and a message discard algorithm. The message discard algorithm may be determined using the traffic congestion policy. For example, a traffic congestion policy may define or indicate that certain traffic rate limits are to be enforced for messages associated with various message priority values and that TM 110 may discard messages when enforcing these message rate limits.

In some embodiments, a first message priority value associated with a first message may be determined using a message attribute of the first message and a path related congestion indicator associated with the first message. For example, TM 110 and/or tracker 200 may use a value from a priority AVP in a Diameter message and a color code associated with the Diameter message when determining a message priority value of the Diameter message.

In some embodiments, a first message priority value associated with a first message may be computed by concatenating one or more bits from the message attribute and one or more bits from the path related congestion indicator.

In some embodiments, a traffic congestion policy may be hot-pluggable. For example, RN 104 and/or TM 110 may be configured for selecting a particular traffic congestion policy based on an application being handled during a congestion event (e.g., when RN 104 is overloaded), In this example, RN 104 and/or TM 110 can change between traffic congestion policies without requiring restarting or rebooting of RN 104.

In some embodiments, determining a first congestion level may include determining an amount of messages queued for processing. For example, TM 110 may determine that RN 104 or another entity is experiencing congestion by monitoring one or more message queues for certain load amounts (e.g., greater than 50% full, greater than 75% full, etc.). In this example, as load amount increases the congestion level may increase.

In some embodiments, a message discard algorithm may limit a message rate of a first set of messages associated with a first priority value by discarding a first amount of messages during a first congestion level. For example, RN 104 and/or TM 110 may enforce a message rate of '5 K/sec' for messages associated with a priority level of 'P-1' (e.g., a low message priority value). In this example, assuming such messages are normally received at a message rate of '25 K\sec', RN 104 and/or TM 110 may discard 80% of these messages. In another example, RN 104 and/or TM 110 may enforce a message rate of '50 K/sec' for messages associated with a priority level of 'P-5' (e.g., a high message priority value). In this example, assuming such messages are normally received at a message rate of '20 K\sec', RN 104 and/or TM 110 may discard none of these messages.

In some embodiments, a message discard algorithm may limit a message rate of a first set of messages by discarding a second amount of messages during a second congestion level, wherein a second amount may be more than a first amount discarded during a first congestion level. For example, RN 104 and/or TM 110 may enforce a message rate of '5 K/sec' for messages associated with a priority level of 'P-1' at a congestion level of 'CL-1' and may enforce a message rate of '0 K/sec' for these messages at a congestion level of 'CL-2'. In this example, assuming such messages are normally received at a message rate of '25 K\sec', RN 104 and/or TM 110 may discard 80% of these messages during a congestion level of 'CL-1' and may discard 100% of these messages during a congestion level of 'CL-2'.

In some embodiments, a first amount of messages discarded by a message discard algorithm may be based on a first percentage associated with a first set of messages or a first congestion level, wherein the first percentage may be different from a second percentage associated with a second set of messages or a second congestion level. For example, for messages associated with a priority level of 'P-1', RN 104 and/or TM 110 may enforce a message rate that is 25% less than a normal message rate of these messages at a congestion level of 'CL-1' and may enforce a message rate that is 50% less than a normal message rate of these messages at a congestion level of 'CL-2'.

In some embodiments, a first amount of messages discarded by a message discard algorithm may be based on a first total message rate allowed for a first set of messages or a first congestion level, wherein the first total message rate allowed may be different from a second message rate allowed for a second set of messages or a second congestion level. For example, for messages associated with a priority level of 'P-1', RN 104 and/or TM 110 may enforce a message rate of '10 K/sec' at a congestion level of 'CL-1' and may enforce a message rate of '5 K/sec' at a congestion level of 'CL-2'.

It will be appreciated that process 500 is for illustrative purposes and that different and/or additional actions may be used. It will also be appreciated that various actions described herein may occur in a different order or sequence.

It should be noted that RN 104, TM 110, tracker 200, shaper 202, and/or functionality described herein may constitute a special purpose computing device, such as Diameter signaling router, a router, or a switch. Further, RN 104, TM 110, tracker 200, shaper 202, and/or functionality described herein can improve the technological field of traffic related congestion management and related computer functionality by using techniques, methods, and/or mechanisms that utilize pluggable traffic congestion policies and/or by using message discard algorithms that determine whether to discard or allow message using traffic pattern information (e.g., message rates), congestion levels, and/or policy-defined message priority values (e.g., message priority values based on one or more policy-determinable factors).

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for discarding messages during a congestion event, the method comprising:
   registering a traffic congestion policy for handling traffic associated with an application during congestion;
   determining a first congestion level associated with a congestion event;
   determining message rates of messages associated with similar message priority values, wherein the message priority values are determined using the traffic congestion policy, wherein a first message priority value associated with a first message is computed using a message attribute in the first message and a path related congestion indicator associated with the first message, wherein the path related congestion indicator comprises a color value assigned by a network operator based on a path to be followed by the first message; and
   discarding the first message associated with the application using the first message priority value, a message rate of messages having the first message priority value, the first congestion level, and a message discard algorithm, wherein the message discard algorithm determines that a message rate of a first set of messages associated with the first message priority value equals or exceeds a threshold message rate value for the first congestion level and, after determining that the message rate of the first set of messages equals or exceeds the threshold message rate value for the first congestion level, the message discard algorithm discards the first message, wherein the message discard algorithm is determined using the traffic congestion policy.

2. The method of claim 1 wherein the first message priority value associated with the first message is computed by concatenating one or more bits from the message attribute and one or more bits from the path related congestion indicator.

3. The method of claim 1 wherein the traffic congestion policy is hot-pluggable.

4. The method of claim 1 wherein determining the first congestion level includes determining an amount of messages queued for processing.

5. The method of claim 1 wherein the message discard algorithm limits the message rate of the first set of messages associated with the first message priority value by discarding a first amount of messages during the first congestion level.

6. The method of claim 5 wherein the message discard algorithm limits the message rate of the first set of messages by discarding a second amount of messages during a second congestion level, wherein the second amount is more than the first amount.

7. The method of claim 5 wherein the first amount is based on a first percentage associated with the first set of messages or the first congestion level, wherein the first percentage is different from a second percentage associated with a second set of messages or a second congestion level.

8. The method of claim 5 wherein the first amount is based on a first total message rate allowed for the first set of messages or the first congestion level, wherein the first total message rate allowed is different from a second message rate allowed for a second set of messages or a second congestion level.

9. A system for discarding messages during a congestion event, the system comprising:
    at least one processor; and
    a traffic manager, wherein the traffic manager is implemented using the at least one processor, wherein the traffic manager is configured for registering a traffic congestion policy for handling traffic associated with an application during congestion, for determining a first congestion level associated with a congestion event, for determining message rates of messages associated with similar message priority values, wherein the message priority values are determined using the traffic congestion , wherein a first message priority value associated with a first message is computed using a message attribute in the first message and a path related congestion indicator associated with the first message, wherein the path related congestion indicator comprises a color value assigned by a network operator based on a path to be followed by the first message, and for discarding the first message associated with the application using the first message priority value and one or more of the message rates, the first congestion level, and a message discard algorithm, wherein the message discard algorithm determines that a message rate of a first set of messages associated with the first message priority value equals or exceeds a threshold message rate value for the first congestion level and, after determining that the message rate of the first set of messages equals or exceeds the threshold message rate value for the first congestion level, the message discard algorithm discards the first message, wherein the message discard algorithm is determined using the traffic congestion policy.

10. The system of claim 9 wherein the first message priority value associated with the first message is computed by concatenating one or more bits from the message attribute and one or more bits from the path related congestion indicator.

11. The system of claim 9 wherein the traffic congestion policy is hot-pluggable.

12. The system of claim 9 wherein determining the first congestion level includes determining an amount of messages queued for processing.

13. The system of claim 9 wherein the message discard algorithm limits the message rate of the first set of messages associated with the first message priority value by discarding a first amount of messages during the first congestion level.

14. The system of claim 13 wherein the message discard algorithm limits the message rate of the first set of messages by discarding a second amount of messages during a second congestion level, wherein the second amount is more than the first amount.

15. The system of claim 13 wherein the first amount is based on a first percentage associated with the first set of messages or the first congestion level, wherein the first percentage is different from a second percentage associated with a second set of messages or a second congestion level.

16. The system of claim 13 wherein the first amount is based on a first total message rate allowed for the first set of messages or the first congestion level, wherein the first total message rate allowed is different from a second message rate allowed for a second set of messages or a second congestion level.

17. A non-transitory computer readable medium comprising computer executable instructions that when executed by at least one processor of a computer cause the computer to perform steps comprising:
    registering a traffic congestion policy for handling traffic associated with an application during congestion;
    determining a first congestion level associated with a congestion event;
    determining message rates of messages associated with similar message priority values, wherein the message priority values are determined using the traffic congestion policy, wherein a first message priority value associated with a first message is computed using a message attribute in the first message and a path related congestion indicator associated with the first message, wherein the path related congestion indicator comprises a color value assigned by a network operator based on a path to be followed by the first message; and
    discarding the first message associated with the application using the first message priority value, a message rate of messages having the first message priority value, the first congestion level, and a message discard algorithm, wherein the message discard algorithm determines that a message rate of a first set of messages associated with the first message priority value equals or exceeds a threshold message rate value for the first congestion level and, after determining that the message rate of the first set of messages equals or exceeds the threshold message rate value for the first congestion level, the message discard algorithm discards the first message, wherein the message discard algorithm is determined using the traffic congestion policy.

* * * * *

UNITED STATES PATENT AND TRADEMARK OFFICE
CERTIFICATE OF CORRECTION

PATENT NO. : 10,291,539 B2
APPLICATION NO. : 15/273069
DATED : May 14, 2019
INVENTOR(S) : Krishan et al.

Page 1 of 1

It is certified that error appears in the above-identified patent and that said Letters Patent is hereby corrected as shown below:

In the Specification

In Column 8, Line 45, delete "'P-4-P-5." and insert -- 'P-4'-'P-5'. --, therefor.

In Column 8, Line 54, delete "'P-4-P-5." and insert -- 'P-4'-'P-5'. --, therefor.

In Column 9, Line 67, delete "'P-4-P-5." and insert -- 'P-4'-'P-5'. --, therefor.

In Column 10, Line 11, delete "'P-4-P-5." and insert -- 'P-4'-'P-5'. --, therefor.

Signed and Sealed this
Twenty-first Day of July, 2020

Andrei Iancu
*Director of the United States Patent and Trademark Office*